United States Patent [19]

von der Heide

[11] Patent Number: 4,892,259
[45] Date of Patent: Jan. 9, 1990

[54] APPARATUS FOR RECEIVING, TRANSPORTING, CHOPPING, AND DISPENSING BLOCKS OF FODDER

[76] Inventor: Hans von der Heide, Ibbenbürener Str. 17, 4530 Ibbenbüren 2 - Laggenbeck, Fed. Rep. of Germany

[21] Appl. No.: 278,974

[22] Filed: Dec. 2, 1988

[30] Foreign Application Priority Data

Dec. 2, 1987 [DE] Fed. Rep. of Germany ....... 3740761
Mar. 9, 1988 [DE] Fed. Rep. of Germany ....... 3807738

[51] Int. Cl.$^4$ .............................................. B02C 21/02
[52] U.S. Cl. .................................................. 241/101.7
[58] Field of Search .................. 241/101.7, 101 A, 200

[56] References Cited

U.S. PATENT DOCUMENTS

| | | | |
|---|---|---|---|
| 3,863,850 | 2/1975 | Freeman | 241/101.7 X |
| 3,972,484 | 8/1976 | Ryan | 241/101.7 X |
| 3,999,674 | 12/1976 | Meitl | 241/101.7 X |
| 4,082,198 | 4/1978 | Anderson et al. | 241/101.7 X |
| 4,101,081 | 7/1978 | Ritter et al. | 241/101.7 |
| 4,531,880 | 7/1985 | Paques | 241/101.7 X |

FOREIGN PATENT DOCUMENTS 35435 2/1981 European Pat. Off. .

Primary Examiner—Timothy V. Eley
Attorney, Agent, or Firm—Felfe & Lynch

[57] ABSTRACT

Apparatus for picking up, transporting, comminuting and discharging blocks of fodder. The new apparatus is to be of simpler and more compact construction than known apparatus, and lower in cost. The new apparatus comprises a container body with a tilting loading platform for loading a block of fodder, and with a cutter chain system disposed laterally on the body and sloping upwardly and outwardly for chopping up and dispensing the fodder. The new apparatus is of very compact construction and only slightly larger than a fodder block. Further, it can be constructed in the form of an attachment for a tractor.

7 Claims, 1 Drawing Sheet

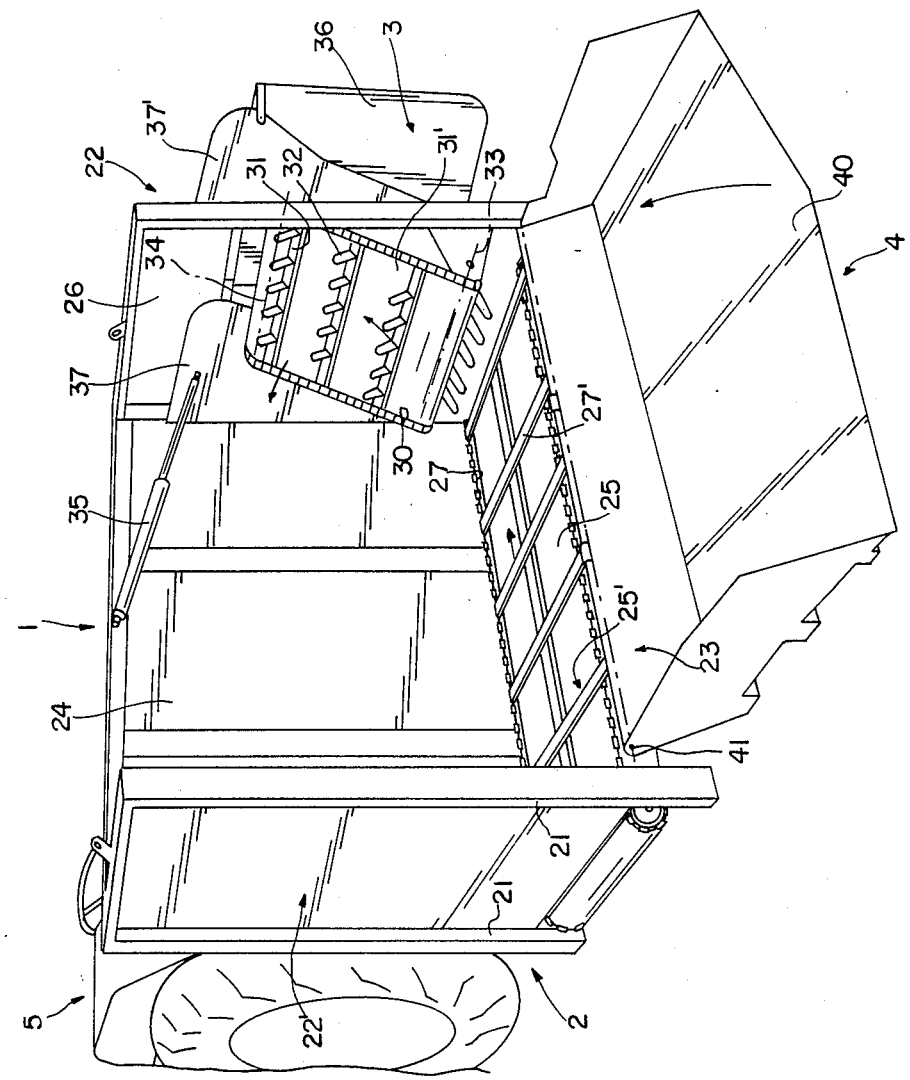

APPARATUS FOR RECEIVING, TRANSPORTING, CHOPPING, AND DISPENSING BLOCKS OF FODDER

The invention relates to an apparatus for receiving, transporting, chopping and dispensing blocks of fodder, especially silage, brewers' grains and/or corn cob mix, with a loading system for loading a block of fodder into the body of the apparatus, with conveyor means disposed on the bottom of the body, and with means for breaking up and dispensing the fodder laterally.

An apparatus of this kind is disclosed in the published European patent application No. 0 035 435. In this apparatus the loading system consists of a telescoping arm which can pivot in a vertical plane, on the free end of which a lift fork is appended for receiving a block of fodder. In addition, the arm also has a cutting means for cutting out blocks. After a block is introduced into the open end of the body, the lift fork is lowered between crossbars running longitudinally on the floor of the body to free the tines from the block and is withdrawn under the block. After it is raised up and again extended and then lowered, the lift fork is brought to the other side of the block. Then the block can be advanced within the body by retracting the telescoping arm, and can be brought onto the scraping and conveying means disposed on the bottom at the closed end of the body. The scraping and conveying means here consist of a transverse conveyor belt with raised scraping bars and of a revolving cross-like loosening device.

It is a disadvantage of the known apparatus that it is complex in construction and has a complicated movement. Also, it is very bulky on account of its great length and thus is not freely usable. The apparatus is furthermore expensive and therefore of interest only in large farming operations. In the case of long-fibered silage, e.g., grass silage, the silage can wind onto the revolving cross-like loosening device, so that reliable operation of the apparatus is not assured.

I have appreciated the problem of creating an apparatus of the kind described above, which will be of simple and compact construction, which will be reliable in operation, and which will be inexpensive to manufacture and operate.

I have accomplished the solution of this problem in accordance with the invention by an apparatus of the kind described above, which is characterized by the fact that the loading device is a platform which can be raised together with a feed block about a horizontal shaft close to the floor and adjacent the open end, from a flat, approximately horizontal position so that it can be driven under the feed block, pick it up, and dump it into the body, to a substantially vertical position closing the end of the body, and vice-versa, and that the means for chopping and discharge consist of at least one cutter chain system disposed laterally on the body and sloping upwardly and outwardly.

The apparatus in accordance with the invention thus comprises simple and sturdy components which assure that they can be manufactured at low cost and will require little maintenance and repair, even when handling heavy silage. The chains can easily be made sufficiently strong, and can easily be replaced if damaged. The tilting up of the loading platform reduces the amount of space required for the apparatus in the operation of discharging the fodder in a stable; the overall size of the apparatus only slightly exceeds the size of the fodder block that can be picked up. Also, the fodder block is effectively loosened up by being dumped into the body, which substantially facilitates the next operation of cutting it up.

To further reduce the amount of space required by the apparatus, I have provided that the cutter chain system can be pivoted upwardly about a shaft disposed in its bottom part and running lengthwise of the apparatus from its working position in which it slopes upwardly and outwardly, to a substantially vertical rest position. The apparatus is thus easy to operate in cramped quarters and can be driven, for example, through narrow gates or entrances. Furthermore, the distance at which the fodder is discharged from the apparatus can be varied to a certain extent by tilting the cutter chain system. To simplify the configuration of the apparatus, the bottom pivot shaft of the cutter chain system is preferably used also both as a pivot shaft and as a drive shaft. The pivoting can be produced, for example, by a piston-and-cylinder unit or any other suitable system, such as a rack-and-pinion system or a drum-and-cable system.

As for the cutter chain system, I have preferably provided for it to comprise two parallel, endlessly circulating chains joined together by a plurality of cross bars which bear on their upper side a number of projecting cutters and which run with their bottom on a smooth guiding surface. This configuration results in a very sturdy and reliable construction of the cutter chain system. At the same time, this cutter chain system very reliably serves its purpose, namely to cut up the block of fodder and to discharge the fodder, in an especially reliable manner, without the need for any great technical complexity, even if heavy silage, such as grass silage, is to be handled.

I have further provided for the floor of the body to be constructed with a scraper flight conveyor with a stepping drive that forces the fodder block against the cutter chain system. This provides the assurance that the fodder block in the body will always be urged with sufficient force against the cutter chain system during the operation of the apparatus, i.e., as the block is broken up and discharged. Further, it assures that the fodder will be completely discharged and that no fodder residues will be left in the body. Since the cutting process calls for only a relatively slow rate of advancement of the fodder block, it is best to provide a slowly moving stepping drive for the scraper flight conveyor.

To adapt the apparatus to a wide variety of applications, I have preferably made provision for it to have hitching means at the closed end of the body for attaching the apparatus to the three-point hitch of a tractor or other such agricultural vehicle. The apparatus thus configured will need no running gear of its own, which permits an especially simple and space-saving design.

To drive the cutter chain system or systems and the scraper flight conveyor, I have provided for them to be driven by a power take-off coupling in the lower middle part of the apparatus through at least one chain drive, belt drive, universal shaft drive and/or bevel gear drive. An alternative configuration provides that the cutter chain system or systems and the scraper flight conveyor can be driven by at least one hydraulic motor.

To reduce the danger of injury and concentrate the discharged fodder within a limited area alongside the apparatus, it is desirable to provide a shield on the outside of the cutter chain system at a distance from the latter and enable it to turn therewith. This shield can be rigid and made of sheet metal or hard plastic, or it can be flexible and made of a flexible material such as rubber or soft plastic.

The platform of the apparatus which serves as the loading means is preferably in the form of a back-reinforced steel plate or a fork and can be pivoted by means of at least one piston-and-cylinder unit which is disposed under the body bottom lengthwise of the axis of the apparatus. The platform is thus stable and at the same time can be driven without great effort underneath a fodder block. Due to its arrangement underneath the floor of the body of the apparatus the piston-and-cylinder unit of the platform is well protected against damage, but is easily accessible for maintenance and repair when the apparatus is raised up.

The apparatus is basically designed to pick up fodder blocks that are already cut, because in many farming operations a separate silage block cutter is available. In an expanded design of the apparatus I have provided for the open end of the body to be provided with a cutting means for cutting a block of fodder from a fodder silo. This addition of a cutting system known in itself enables the apparatus also to be used for cutting fodder blocks out of silos. This embodiment is desirable especially for operations in which a separate silage block cutter is not on hand.

In accordance with the invention, apparatus for picking up, transporting, comminuting and dispensing fodder blocks, especially silage, brewers' grains and/or corn cob mix, comprises a body open at its one end and loading means for loading a fodder block into the body. The apparatus includes conveyor means disposed on a floor of the body and running transversely of a longitudinal axis of the apparatus. The apparatus also includes means for the comminution and lateral discharge of the fodder block. The loading means comprises a platform which can be turned with a fodder block about a horizontal shaft close to the floor of the body and adjacent the open end from a flat, approximately horizontal position for driving under the block and picking it up and dumping it into the body, to a substantially vertical position closing the end of the body, as well as in the reverse direction. The means for the comminution and discharge comprises at least one cutter chain system disposed laterally on the body and sloping upwardly and outwardly.

For a better understanding of the invention, together with other and further objects thereof, reference is made to the following description, taken in connection with the accompanying drawings, and its scope will be pointed out in the appended claims.

Referring now to the drawing, the single FIGURE of the drawing is a perspective view of the open, rearward end of the apparatus with the platform lowered.

As it can be seen in the FIGURE, the apparatus 1 comprises essentially a body 2 defining an approximately parallelepipedal chamber. The body 2 comprises a frame 21 of box and angle irons, and of a perforated wall at the closed front end 24, a sheet-metal wall at the closed left lateral surface 22', and a floor 25. The floor 25 is in the form of a scraper flight conveyor 25' comprising two chains 27 circulating horizontally across the longitudinal axis of the apparatus 1, with transversely disposed scraper flights 27' disposed between them.

On the right side 22 of the body, which is not closed by sheet metal or the like, a cutter chain system 3 is installed in the present embodiment of the apparatus 1. This cutter chain system 3 comprises two shafts 33 and 34 which are disposed parallel to one another lengthwise of the apparatus. Two parallel, endlessly circulating chains 30 are carried around the two shafts 33 and 34 with the interposition of sprockets borne on the shafts 33 and 34. The bottom shaft 33 serves simultaneously as the drive shaft which can be powered by a drive mechanism, not actually shown, from a tractor 5 hauling the apparatus 1 with its three-point hitch. The upper shaft 34 serves only as an idler. The bottom shaft 33 is also a pivot shaft for the entire cutter chain system 3, i.e., the cutter chain system 3 can pivot in a vertical plane with its upper end on the shaft 34 situated in the bottom part. For this purpose a piston-and-cylinder unit 35 is disposed between the upper part of the cutter chain system 3 and the end wall 24 of the body and serves to control the position of the cutter chain system 3 relative to the body 2. In its working position, as shown in the FIGURE, the cutter chain system 3 slopes upward and outward, while in its rest position the cutter chain system 3 is substantially vertical. This facilitates passage through narrow entrances or gates. Above the cutter chain system 3 a discharge opening 26 is left free in the body 2, and through it the comminuted fodder can be carried out of the body 2 by means of the cutter chain system 3. The cutter chain system has for this purpose, in addition to the two chains 30, a plurality of crossbars 31 which are disposed transversely between the chains and run with their bottom on a smooth guiding surface 31'. The upper side of the crossbars 31 facing the interior of the body 2 and thus facing a fodder block contained therein, is equipped with a number of cutters 32 which serve to comminute the fodder block and loosen it up and to transport the fodder. During operation the chains 30 run upward from the bottom with the crossbars 31 and the cutters 32 on the side of the cutter chain system 3 facing the interior of the body 2 and the fodder block therein. The fodder cut from the fodder block passes out through the discharge opening 26 where it drops freely down between the outer side of the cutter chain system 3 and a shield 36 mounted externally at a distance from the latter, onto the aisle of the stable or into a parallel feed trough. To limit the dumping of the fodder to a narrowly defined area alongside the apparatus 1, the cutter chain system is provided with deflectors 37 and 37' on the front and rear. The deflector 37 serves in the present embodiment of the apparatus 1 also for holding the point of attachment of the end of the piston-and-cylinder unit 35 adjacent the cutter chain system 3.

To force a fodder block in the body 2 with sufficient fore against the cutter chain system 3, the scraper flight conveyor 25' of the body floor 25 is equipped with a stepping drive which provides for a steady, sufficiently great feeding and forcing of the fodder block against the cutter chain system 3.

Finally, the apparatus 1 of the embodiment represented also has a loading platform 4 in the form of a steel plate 40, which is so thin and flat that it can be driven under a cut block of fodder. After it is driven under the fodder block the loading platform can be raised by means of a piston-and-cylinder unit disposed underneath the body floor from its level pick-up position to an approximately vertical position, thus dumping the block into the interior of the body 2, thus loosening it up. In its raised position the loading platform 4 closes up the rearward end 23 of the body 2 which is shown still open in the FIGURE. The platform 4 pivots about a shaft 41 situated close to the body floor and disposed transversely of the apparatus 1.

In addition to the way in which it is represented in the drawing, the cutter chain system 3 can also be disposed on the opposite side 22' of the body 2, or two cutter chain systems 3 can be provided, i.e., one on the left and one on the right side 22' and 22, respectively, of the body 2.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for picking up, transporting, comminuting and dispensing fodder blocks, especially silage, brewers' grains and/or corn cob mix, comprising:
    a body having an open end;
    loading means for loading a fodder block into said body;
    conveyor means disposed on a floor of said body and running transversely of a longitudinal axis of the apparatus; and
    means for the comminution and lateral discharge of the fodder block, said loading means comprising a platform which can be turned about a horizontal shaft close to said floor of said body and adjacent said open end from a flat, approximately horizontal position for driving under a block and picking it up and dumping it into said body, to a substantially vertical position closing said end of said body, as well as in the reverse direction, and said means for the comminution and discharge comprising at least one cutter chain system disposed laterally on said body and sloping upwardly and outwardly.

2. Apparatus in accordance with claim 1, in which said cutter chain system can be rotated about a shaft disposed in its lower part in a longitudinal direction of the apparatus, upwardly and outwardly at an angle to a substantially vertical rest position.

3. Apparatus in accordance with claim 2, characterized in that said cutter chain system and said scraper flight conveyor can be driven by at least one hydraulic motor.

4. Apparatus in accordance with claim 2, which includes, externally on said cutter chain system, at a distance from the latter, a shield which can be turned with the latter.

5. Apparatus in accordance with claim 2, in which said cutter chain system comprises two chains revolving endlessly parallel, which are joined together by a plurality of crossbars which bear on their upper side a number of projecting cutters and which run with their bottom over a smooth guiding surface.

6. Apparatus in accordance with claim 1, in which said body comprises a bottom in the form of a scraper flight conveyor with a stepping drive forcing the fodder block against the cutter chain system.

7. Apparatus in accordance with claim 1, which includes hitching means disposed on a closed end of said body for attaching the apparatus to a three-point hitch of a tractor or other such agricultural working vehicle.

* * * * *